Aug. 16, 1927.

A. B. SCHREIBER

STOCK FEED COMPOUND

Filed March 18, 1926

1,638,963

A. B. Schreiber, INVENTOR.

BY

Geo. F. Kimmel, ATTORNEY.

Patented Aug. 16, 1927.

1,638,963

UNITED STATES PATENT OFFICE.

ALLEN B. SCHREIBER, OF ST. JOSEPH, MISSOURI.

STOCK-FEED COMPOUND.

Application filed March 18, 1926. Serial No. 95,730.

This invention relates to a feed compound and pertains particularly to a balanced ration animal feed compound.

The primary object of this invention is the provision, in a manner as hereinafter set forth, of an animal feed formed of a combination of feeds and molded or otherwise formed in short cylindrical particles which are prepared in such a manner as to maintain their form under all conditions so that the feed will be easy to pour and handle at all times.

Another object of the invention is the provision, in a manner as hereinafter set forth, of an animal feed compound containing a high percentage of molasses as the main ingredient of the feed and as a binder therefor, and so formed that the feed will not run together or form a mass even in warm moist weather, or freeze into a mass in cold weather.

Applicant is aware that various feed compounds have been manufactured which contain molasses in a widely varying degree of strength, in combination with other feed stuffs. These compounds, if they contain a high percentage of molasses, are prone to soften and merge into a solid compact mass in warm or moist weather thus making it necessary for the stock feeder to break up the mass before feeding to the stock, resulting in loss through the scattering of small bits of the feed. In cold or freezing weather these stock compounds unless carefully protected, will freeze into a solid block making it necessary to chop the same into small pieces before the same can be given to the animals. If the feeds are made up with small percentage of molasses, it lacks the proper amount of a very essential food and further than this, although it will maintain its granular form, it will be so fine that large quantities will be wasted through the scattering of the same by the animal while feeding. Such feed compounds if they contain a small quantity of molasses, do not give a balanced ration and it is thus necessary to add thereto additional feeds to bring the ration up to the proper standard.

In the feed compound embodying this invention, a high percentage of molasses is incorporated with other essential feeds to give a balanced ration and further than this the feed mixture is presented in the form of small cylindrical particles having a coating or surface of a feed stuff of which the animals are particularly fond so that besides giving the animals a first taste of a food which they like thus inducing them to eat more of the feed, the interior of each of the particles is retained in a moist condition by the coating. The formation of the feed in the coated particles described gives a product which can be easily handled and poured under all conditions, while at the same time the feed will not soften or mass together even under the most unfavorable of warm and moist atmospheric conditions.

The invention will be best understood from a consideration of the following detailed description taken in connection with the accompanying drawing, forming a part of this specification, with the understanding that the invention is not strictly confined to the showing of the drawing but the articles may be changed and modified in shape, so long as such modifications mark no material departure from the salient features of the invention as expressed in the appended claims.

In the drawing:—

Figure 1:
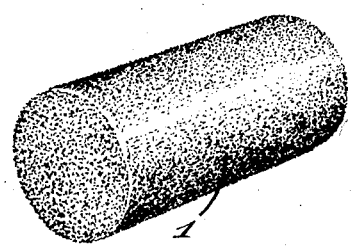
Figure 1 shows in perspective one of the particles of the prepared animal feed compound embodying this invention.
Figure 2:
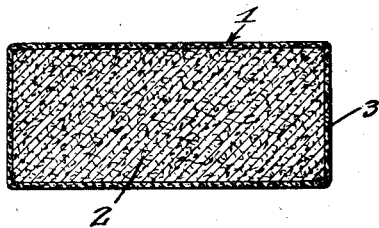
Figure 2 shows a longitudinal section of the same, showing the covering or coating of feed material, by means of which the interior of the particle is maintained in proper condition.

The feed stuff embodying this invention has the following composition:—

Molasses, approximately 55%,
Cotton seed meal, approximately 12%,
Mill byproducts, approximately 18%,
Grain screenings, approximately 5%,
Alfalfa meal, approximately 10%.

The manner and order of mixing of the above set forth ingredients is as follows:—

The mill byproducts, grain screenings and alfalfa meal, are first ground very fine and there is mixed with these three substances approximately 5% of the cotton seed meal. The molasses, which is contained in a tank having means for heating the same, where it is heated to approximately 120° Fahr., is mixed in this heated condition with the ground feed. Suitable mixing paddles are employed by means of which the mixture is thoroughly rubbed and beaten in order to completely saturate the same with the molasses.

The foregoing mixture is permitted to stand for the purpose of curing, for approximately twenty-four hours. After this curing process the mixture is fed into a suitable machine from which it is forced through apertures for the purpose of forming the mixture into cylindrical strings.

Immediately upon leaving the machine which forms the mixture into cylindrical strings, these strings are cut into lengths ranging from one-half to two inches and these cylindrical particles of the feed pass immediately into a shaker machine in which they are rolled and thoroughly coated with approximately 5% more of the cotton seed meal. The cut particles of feed, being immediately coated with cotton seed meal as they emerge from the forming machine are thus prevented from adhering and running together and reverting to the former condition of a soft mass in which it was placed into the forming machine.

After the feed particles have been formed and coated in the manner described, these particles are carried upon a flat shaker for approximately two minutes in order to give them a chance to cool and dry slightly. In cold weather the feed particles thus formed can be immediately placed in sacks and stored ready for use as the coating given to the particles and slight drying allowed, will form a protective covering or shell about each particle.

During the summer weather, the feed is taken from the shaker and passed to a cylindrical dryer where it is subjected to a temperature of about 400° Fahr. of heat for approximately ten minutes, this process tending to form a hard casing about each of the particles and after taken from the dryer the feed is then recoated with cotton seed meal to replace any that may have been knocked off during the drying process.

As has been before stated when the feed mixture is forced from the forming machine, it emerges in the form of cylindrical strings and immediately is cut into particles of approximately one-half to two inches in length and falls into a receptacle where the particles are coated with cotton seed meal. These particles then have the general appearance of the specimen indicated upon the drawing by the numeral 1. The interior 2 of the body contains the moist mixture of molasses, mill byproducts, grain screenings, and alfalfa meal, in addition to approximately 5% of cotton seed meal while the exterior of this body is covered by the layer 3 of cotton seed meal which forms approximately 5% more of the feed mixture. It will be readily seen that the drying action of the cotton seed meal coacting upon each of the particles or bodies 2 thus effectually protects the body 2 preventing the evaporation of the moisture contained in the molasses and at the same time preventing the bodies from adhering and massing together. The animals, being particularly fond of the cotton seed meal, will thus first obtain a taste of the food which they like most and will be induced to eat the feed readily.

From the foregoing described process, it will be seen that this feed goes almost immediately from one operation to the other with the exception, of course, of the curing and drying steps.

The percentages of the feed may be varied as desired, although applicant has found the percentages herein set forth to give the best balanced ration, but for the obtaining of the best results, the percentage strength of molasses cannot be varied more than two or three percent and it is not possible to obtain the result herein described unless the feed particles or bodies are immediately coated with the cotton seed meal upon leaving the forming machine. Unless this coating is done the feed particles will adhere and again mass together.

If it is desired to apply an additionally heavy coating of the cotton seed meal to the bodies 2, the product is dropped through a sprayer box in which a molasses spray is projected and through which the bodies fall. The bodies of course, receive a coating of this molasses and they are then again rolled in the cotton seed meal until a heavy coating is taken on.

From the foregoing description it may be readily seen that the product herein described is one having material points of advantage over cattle feeds heretofore produced as a well balanced ration is given to the cattle in a form which necessitates through chewing of the feed or consumption of the same thus insuring proper mastication and digestion, the particle bodies are not easily broken, therefore, waste resulting from small bits of the feed being dropped is eliminated and finally the feed is in such form that it will not cake, or freeze or get in any other condition which would cause it to be hard or inconvenient to handle.

Having thus described my invention what I claim is:—

A cattle food of the character described, comprising bodies composed of a mixture of dry feeds and a liquid food, and a coating of food of sufficient density about each of said bodies designed to effect an unbroken seal to maintain the interior of the bodies permanently in a moist condition and to prevent the bodies from adhering.

In testimony whereof, I affix my signature hereto.

ALLEN B. SCHREIBER.